June 12, 1928.
C. E. KILGOUR
1,673,079
RADIO TUNING CONTROL DEVICE
Filed April 5, 1927
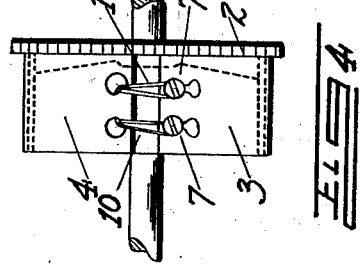
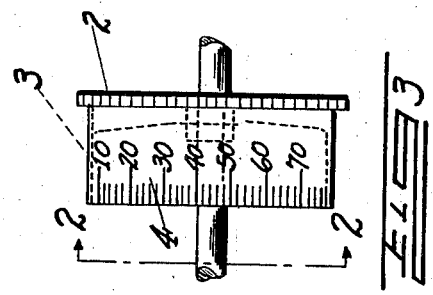
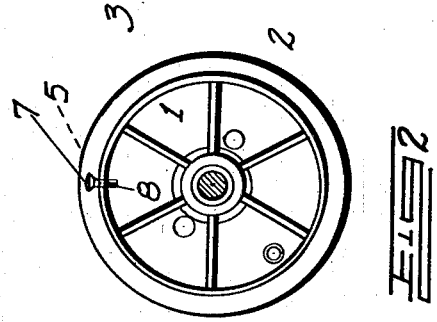
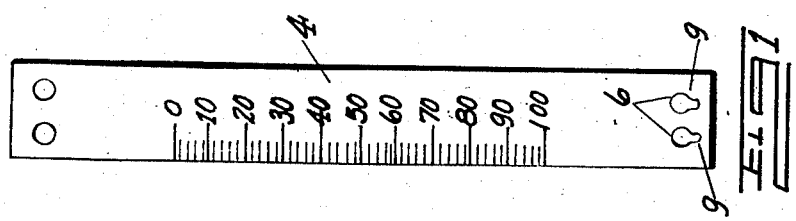
Charles E. Kilgour  INVENTOR
BY
Allen & Allen ATTORNEY Patented June 12, 1928.

1,673,079

UNITED STATES PATENT OFFICE.

CHARLES E. KILGOUR, OF CINCINNATI, OHIO, ASSIGNOR TO THE CROSLEY RADIO CORPORATION, OF CINCINNATI, OHIO, A CORPORATION OF OHIO.

RADIO TUNING CONTROL DEVICE.

Application filed April 5, 1927. Serial No. 181,185.

My invention relates to radio tuning control devices and particularly to means of attaching a calibrated chart to a control dial or hub.

It is the object of my invention to provide particularly for a unit control dial or wheel, a calibrated chart which may be mounted around the periphery of the hub of the wheel or dial so that a very large scale may be inexpensively attached to the control element which will permit very accurate tuning.

Referring to the drawings in which I have illustrated a preferred embodiment:

Figure 1 is a plan view of a preferred type of calibrated chart.

Figure 2 is a sectional view of the shaft on which the control is mounted showing an end view of the control element as it would appear from the position indicated by the dotted lines 2—2 in Figure 3.

Figure 3 is a side elevation of the control element with the chart mounted on it as viewed from one position.

Figure 4 is a side elevation of the control element with the chart mounted on it as viewed from a different position from that shown in Figure 3.

Generally indicated at 1 is the shaft on which the control element is mounted. The shaft is rotatable by means of a disc or dial 2 mounted on the shaft. The disc has preferably a knurled outer periphery which is so arranged in the radio set that it will be exposed for manual operation. The disc 2 has an enlarged hub portion 3 around which the calibrated chart 4 is mounted and suitably secured as will be hereinafter explained.

For securing the chart to the enlarged hub of the control element, I have provided a pair of threaded holes, the outer one of which is indicated in dotted lines at 5 in Figure 2. The chart has orifices 6 therein which will allow the chart to be inserted over the heads 7 of screws 8 which are secured within the threaded holes. The orifices 6 have narrowed ends 9 which fit snugly about the shanks of the screws when the chart is drawn circumferentially around the hub. The end of the chart opposite the end having the orifices 6 has holes through which the body of an elastic band 10 may be drawn; and the loops of the band may then be secured, each end loop to one of the screws 8.

It will be obvious that single holes or orifices in a chart will allow the chart to be retained in a similar manner. Other modifications will occur to those skilled in the art.

It is essential however, to the successful securing of a chart to a control element that the control element have an enlarged hub and that there shall be a screw or pin secured to the hub to definitely locate the chart. The chart must be provided with a resilient member to secure the other end to the screw or pin. A spring might be used in place of the elastic band but I have found my use of an elastic band more satisfactory.

In manufacturing, the labor cost of each step is of importance as is the skill of the operator performing each step. With my structure as disclosed herein, there is great saving of labor cost and as the rubber band, if it be of good quality of rubber, will last for a long time, a much more permanent structure is provided than would seem possible. The fact that the chart when once mounted does not normally tend to slip prevents varying strains on the elastic band, consequently the elastic band provides a very permanent resilient connection.

Having thus described my invention, what I claim as new and desire to secure by Letters Patent, is:

1. In combination with the hub of a tuning control element, a calibrated chart, means extended from said hub to which one end of said calibrated chart may be secured and resilient means secured to the end of said chart opposite that to which the first mentioned end is secured adapted to be secured to said means extending from said hub to secure said chart snugly about said hub, said means comprising an elastic band, said calibrated chart having at least one hole in the last mentioned end through which said elastic band is secured.

2. A tuning control element having an annular portion operatively connected therewith, a chart portion operatively connected therewith, a chart adapted to be mounted on said annular portion, said chart having the end portions thereof provided with holes, means extended from said annular portion adapted to engage the holes in one end of said chart and flexible means extended from the holes in the other end of said chart adapted to engage said means extended from said hub.

3. A tuning control element having an annular portion operatively connected therewith, a chart portion operatively connected therewith, a chart adapted to be mounted on said annular portion, said chart having the end portions thereof provided with holes, means extended from said annular portion adapted to engage the holes in one end of said chart and resilient means extended from the holes in the other end of said chart adapted to engage said means extended from said hub, said resilient means comprising a rubber band having portions extending through the holes in the last mentioned end of said chart and the end loops thereof secured about said means extended from said annular member.

CHARLES E. KILGOUR.